United States Patent
Henke

Patent Number: 5,812,347
Date of Patent: Sep. 22, 1998

[54] POSITIVE DRIVE HEAD POSITIONING APPARATUS

[75] Inventor: Steve Henke, Canton, Mich.

[73] Assignee: Exabyte Acquisition Subsidiary Corp., Boulder, Colo.

[21] Appl. No.: 805,098

[22] Filed: Dec. 10, 1991

[51] Int. Cl.[6] .......................................... G11B 5/55
[52] U.S. Cl. ........................................ 360/106; 369/223
[58] Field of Search .................... 360/106, 109, 360/104, 92; 369/223

[56] References Cited

U.S. PATENT DOCUMENTS

| | | | |
|---|---|---|---|
| 3,531,600 | 9/1970 | Camras | 360/125 |
| 4,270,155 | 5/1981 | Bejerano | 360/106 |
| 4,376,961 | 3/1983 | Torii et al. | 360/106 |
| 4,422,111 | 12/1983 | Moeller | 360/72 |
| 4,491,890 | 1/1985 | Rudi | 360/106 |
| 4,717,978 | 1/1988 | Ichinose | 360/106 |
| 4,747,004 | 5/1988 | Kikreja | 360/106 |
| 4,802,030 | 1/1989 | Henry | 360/60 |
| 4,833,558 | 5/1989 | Baheri | 360/106 |
| 4,866,548 | 9/1989 | Rudi | 360/77 |
| 4,972,282 | 11/1990 | Noda et al. | 360/106 |
| 5,105,322 | 4/1992 | Steltzer | 360/106 |
| 5,132,858 | 7/1992 | Baheri | 360/109 |

FOREIGN PATENT DOCUMENTS

| | | | |
|---|---|---|---|
| 0018646 | 5/1979 | European Pat. Off. | 360/106 |
| 57-69526 | 4/1982 | Japan | 360/106 |
| 61-117770 | 6/1986 | Japan | 360/109 |
| 62-20181 | 1/1987 | Japan | 360/106 |
| 62-231473 | 10/1987 | Japan | 360/106 |

*Primary Examiner*—Stuart S. Levy
*Assistant Examiner*—Kevin M. Watkins
*Attorney, Agent, or Firm*—Gifford,Krass,Groh,Sprinkle,Patmore,Anderson&Citkowski

[57] ABSTRACT

A head positioning apparatus for a magnetic drive for positioning the head of the tape drive relative to the several tracks on the magnetic tape. The positioning apparatus includes a lead screw driven by a stepper motor, a half nut on a carriage carrying the head and threadably engaging the lead screw, and a spring clip secured at its opposite ends to the half nut and embracing the lead screw and acting to urge the lead screw laterally relative to the rotational axis of the lead screw into positive threaded cooperation with the threads of the half nut so as to preclude lost motion between the lead screw and the carriage during movement of the head between adjacent tracks and so as to preclude movement of the head following arrival of the head at a specific track unless and until the lead screw is again rotated by energization of the motor.

10 Claims, 5 Drawing Sheets

POSITIVE DRIVE HEAD POSITIONING APPARATUS

BACKGROUND OF THE INVENTION

This invention relates generally to tape drives for tapes and more particularly to an apparatus for positioning the read/write head of the tape drive relative to the respective tracks on the tape.

In order to store as much data as possible on a magnetic tape, the data is typically recorded on a number of parallel, longitudinally oriented tracks on the tape. In order to read and write the data onto the tape with respect to the separate tracks, the head must be able to move transversely across the tape in increments as small as the width of a track and must be maintained in the proper orientation at each track. Typically, a lead screw driven by a stepper motor is provided for this purpose. The head is mounted on a carriage which threads onto the lead screw so that, for a given amount of rotation of the lead screw, the carriage and thereby the head is displaced a predetermined distance across the tape.

To maximize the data storage capacity of a tape, the tape is divided into a large number of tracks which are individually extremely small in width. As a result, the head must be positioned with great precision relative to each individual track and, specifically, the clearance between the threads on the carriage and the threads on the lead screw must be minimized to prevent slop or hysteresis in the initial start up of the drive mechanism and upon halting of the drive mechanism, and to preclude motion of the head relative to the track when the lead screw is not rotating.

Further, it is important that the amount of movement imparted to the head upon movement of the head between adjacent tracks correspond exactly to the distance between the adjacent tracks to ensure precise alignment of the head with the starting track as well as with the adjacent track.

Thus a need exists for a head positioning apparatus that eliminates play in the drive system upon start up and halting of the drive system, that ensures that the head remain in any position to which it is moved by the drive system, and that ensures that the amount of movement imparted to the head upon movement between adjacent tracks will correspond exactly to the distance between the adjacent tracks.

SUMMARY OF THE INVENTION

The present invention is directed generally to the provision of an improved head positioning apparatus for a tape drive.

More specifically, the present invention is directed to the provision of a head positioning apparatus for a tape drive that provides positive, accurate movement of the head between adjacent tracks and which is simple, inexpensive, and reliable in operation.

The head positioning apparatus of the invention is of the type including a carriage carrying the head and drive means, including a lead screw, operative in response to rotation of the lead screw to move the carriage relative to the tape of the tape drive. According to the invention, the drive means includes thread means fixedly defined on the carriage and spring means acting on the lead screw and urging the lead screw laterally relative to the rotational axis of the lead screw into threaded coaction with the thread means on the carriage. This arrangement provides a simple and inexpensive means for providing intimate engagement between the threads on the lead screw and the threads on the carriage so as to eliminate slop or hysteresis in the starting and stopping of the drive mechanism and so as to ensure that the head will remain in the precise position to which it is moved until the lead screw is again rotated.

According to a further feature of the invention, the thread means on the carriage includes arcuate partial threads defined on the carriage. This arrangement ensures adequate threaded engagement as between the lead screw and the carriage so as to positively drive the carriage in response to rotation of the lead screw and so as to provide sufficient frictional engagement as between the lead screw and the carriage threads to preclude unwanted relative movement between the lead screw and the carriage.

According to a further feature of the invention, the spring means comprises a steel band secured at its opposite ends to the carriage and embracing the lead screw. This arrangement provides a simple, inexpensive and effective means of urging the lead screw laterally relative to its rotational axis into intimate threaded coaction with the threads on the carriage.

In the disclosed embodiment of the invention, the thread means on the carriage are defined by a partial nut formed on the carriage and the steel band comprises a spring clip having a U-shaped configuration including spaced leg portions and a central bight portion with the leg portion secured to the carriage proximate the partial nut and the bight portion engaging the lead screw at a location generally diametrically opposed to the location of the threaded engagement of the lead screw with the thread defined by the partial nut.

According to another aspect of the invention, the head is driven by an electric motor having an output shaft and the drive means interconnected between the output shaft of the motor and the head is operative in response to one complete rotation of the output shaft to move the head from a position in alignment with one track on the tape to a position in alignment with an adjacent track on the tape. This arrangement and methodology avoid inaccuracies in the movement of the head between adjacent tracks since the required movement of the head is accomplished by one complete revolution of the motor with the same precisely determinable starting point and the same precisely determinable ending point. In the disclosed embodiment of the invention, the motor comprises a stepper motor and the drive means interconnecting the output shaft of the motor and the lead screw comprises a drive train including a pinion gear connected to the output shaft of the motor peripherally and meshingly driving a lead screw gear connected to the lead screw.

DETAILED DESCRIPTION OF THE PREFERRED EMBODIMENT

Figure 1:
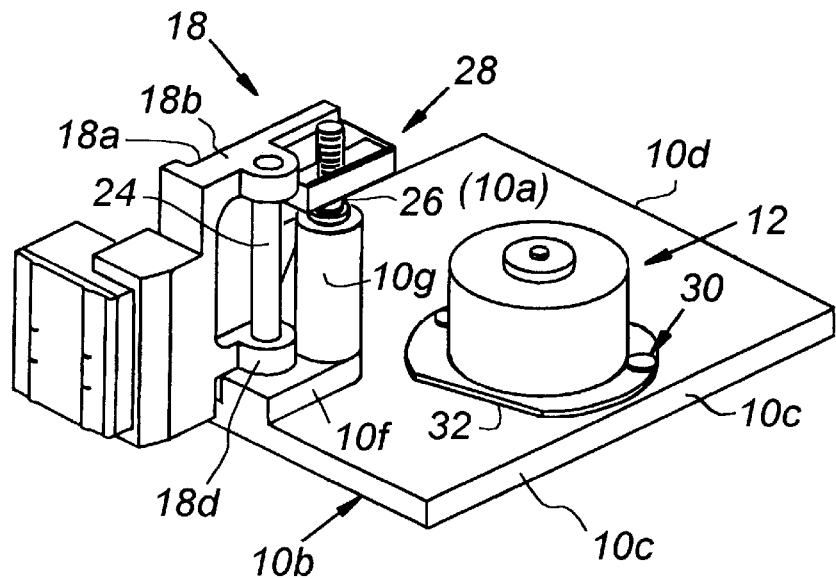
FIG. 1 is a perspective view of the invention head positioning apparatus.
Figure 2:
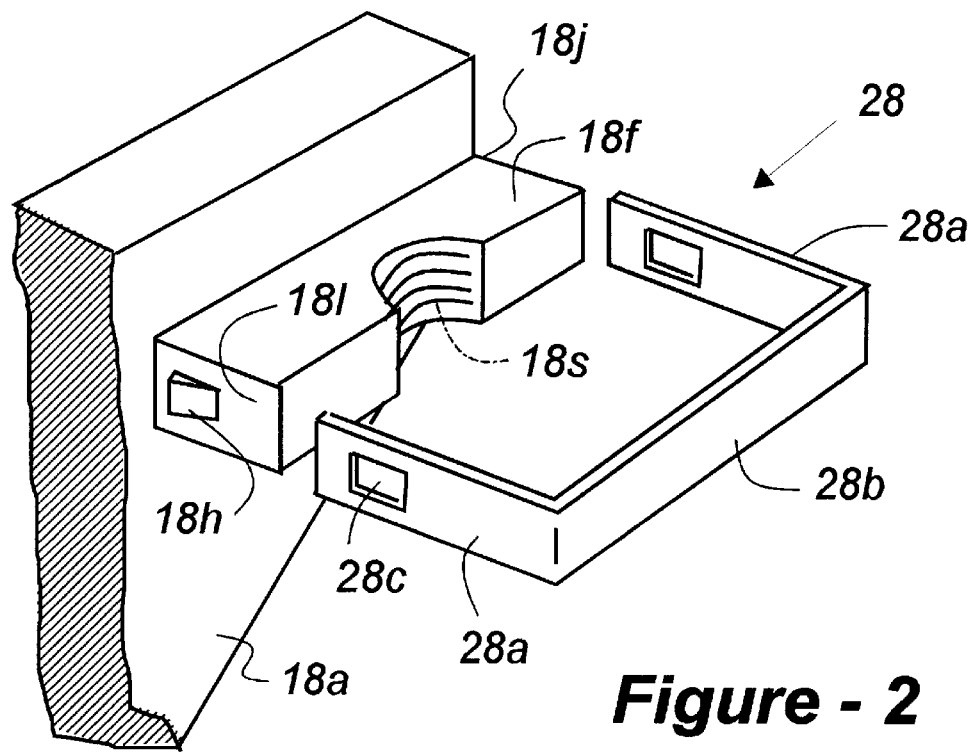
FIG. 2 is a perspective fragmentary view of a portion of the apparatus of FIG. 1.
Figure 3:
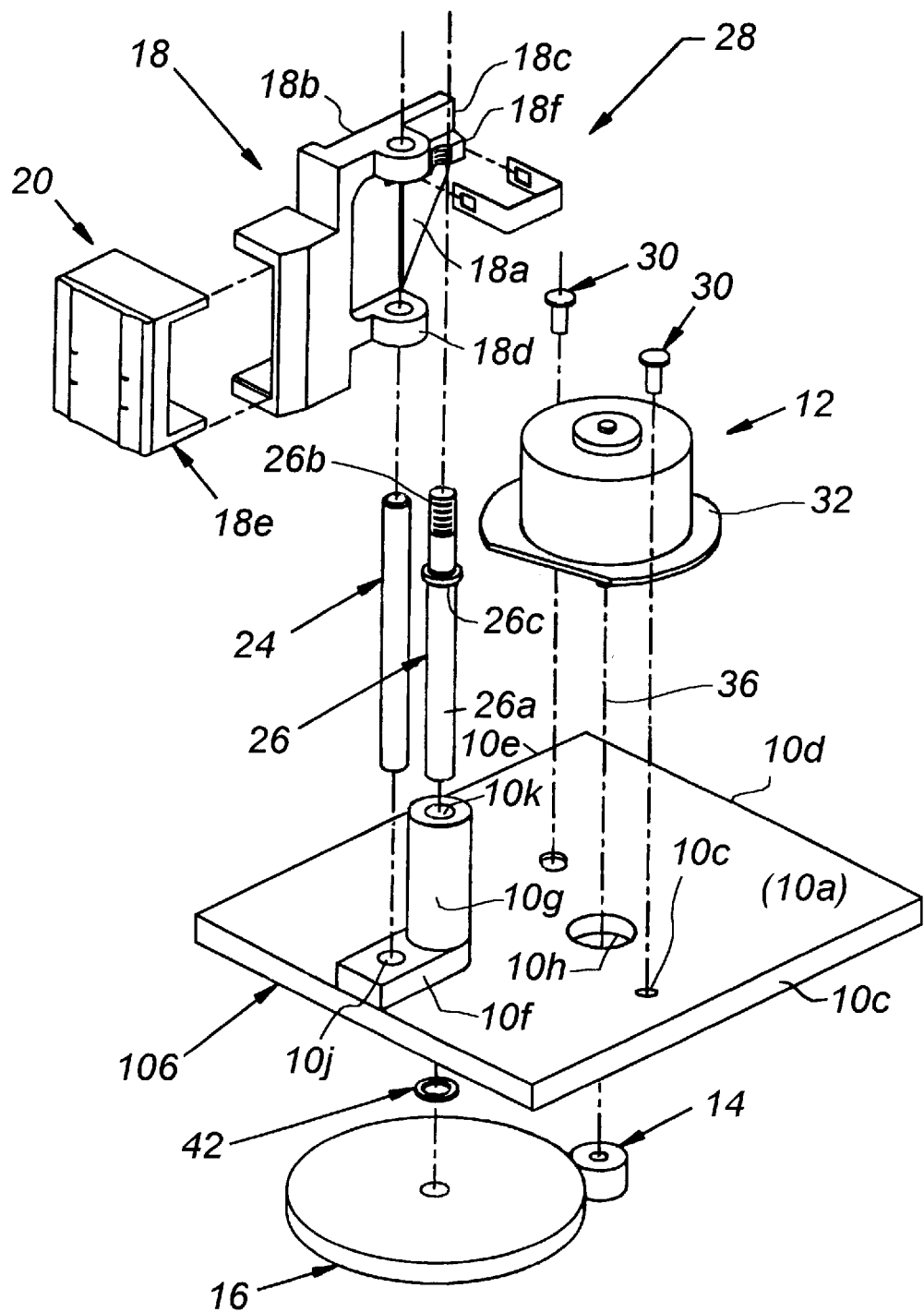
FIG. 3 is an exploded view of the invention head positioning apparatus.
Figure 4:
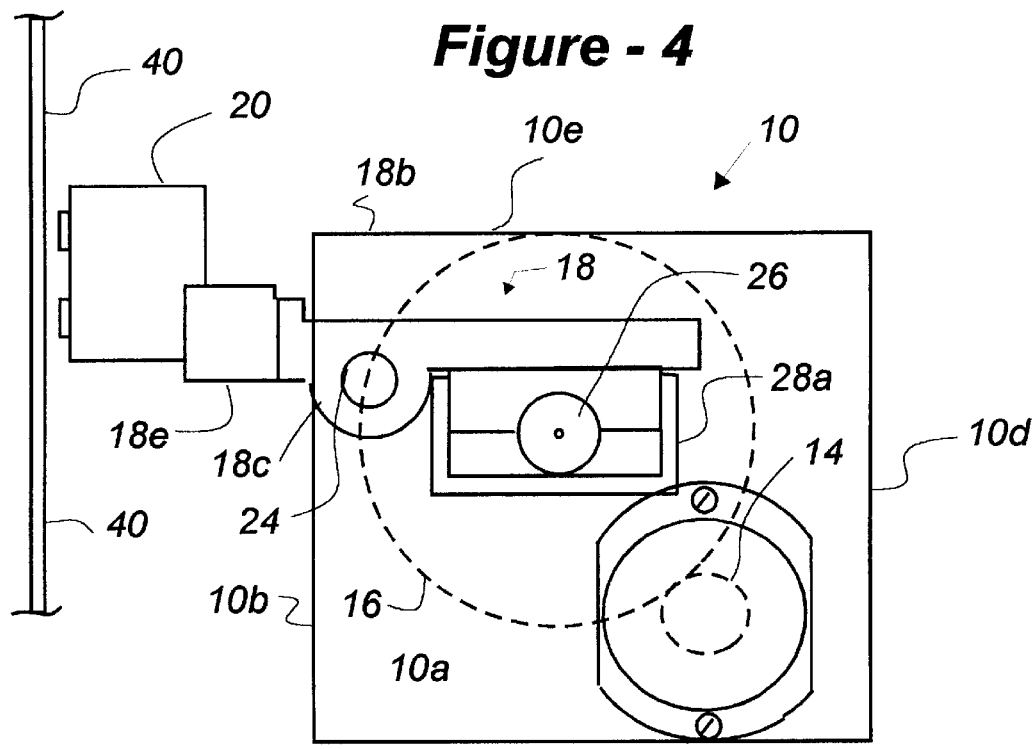
FIGS. 4, 5, and 6 are top, side, and end views, respectively, of the invention head positioning apparatus.
Figure 5:
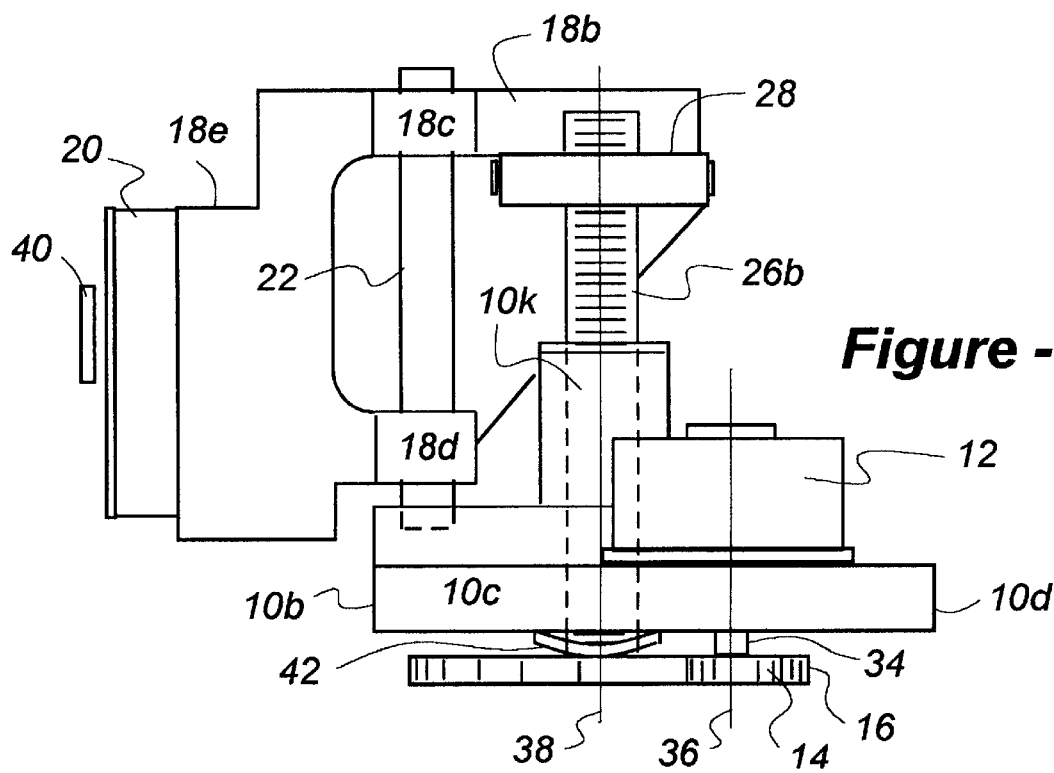
Figure 6:
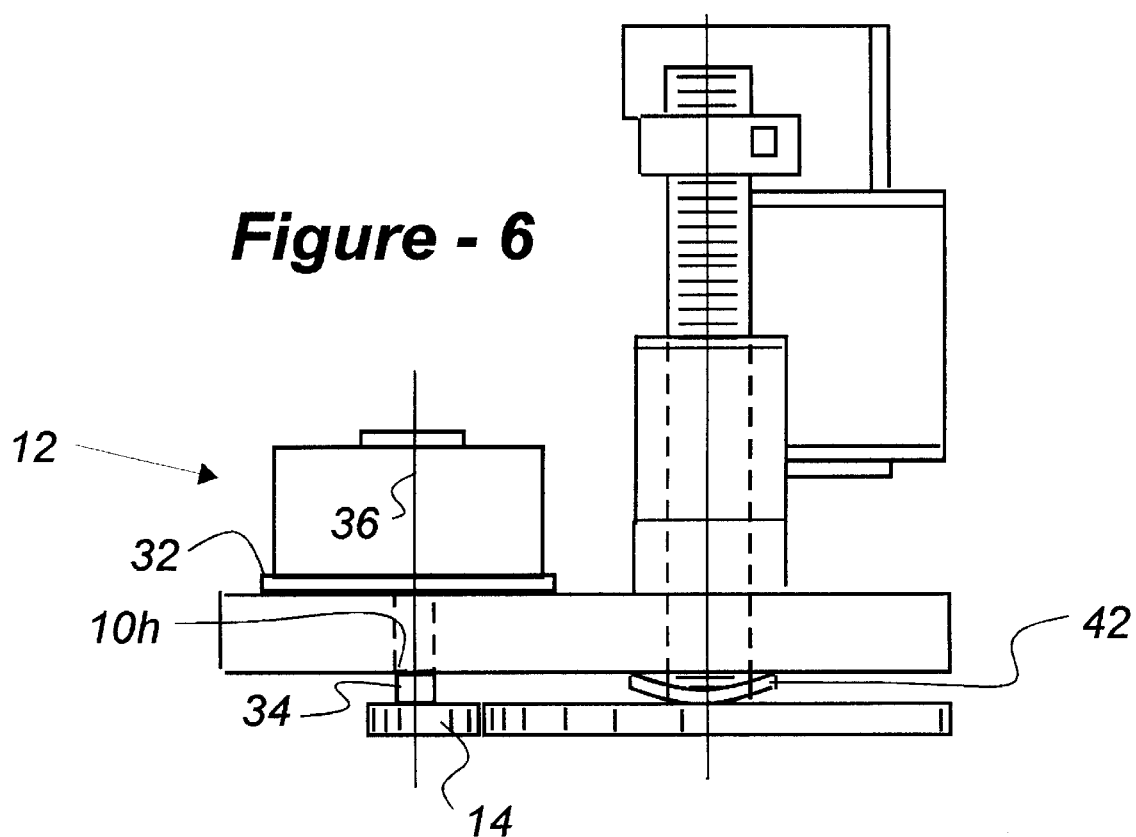
Figure 7:
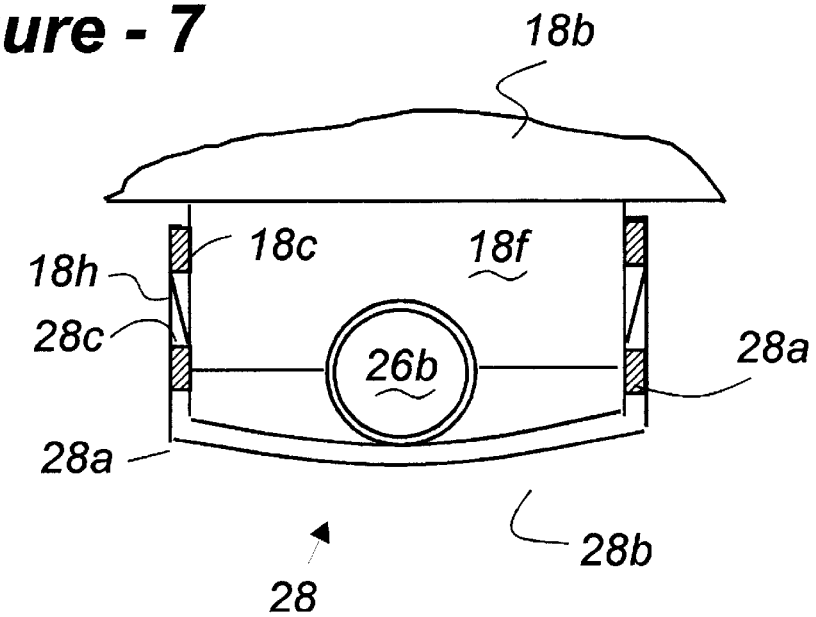
FIG. 7 is a fragmentary top view of a portion of the invention head positioning apparatus.

The invention head positioning apparatus will be understood to be a part of a magnetic tape drive (not illustrated)

and includes a base plate 10, a motor 12, a pinion gear 14, a lead screw gear 16, a carriage 18, a head 20, a guide shaft 24, a lead screw 26, and a spring clip 28.

Base plate 10 is formed of a glass filled polycarbonate material and includes a generally planar main body portion 10a defined by side edges 10b, 10c, 10d and 10e, a platform portion 10f upstanding from main body portion 10a proximate side edge 10b and extending toward side edge 10d, a hollow pedestal portion 10g upstanding from platform portion 10f, and a central aperture 10h in main body portion 10a.

Stepper motor 12 is secured to the upper face of main body plate portion 10a by screws 30 passing through apertures in a stepping motor flange 32 for threaded engagement with threaded apertures 10i in the main body portion 10a to mount the motor on the upper face of the main body plate portion with the output shaft 34 of the motor extending through aperture 10h to a location below base plate 10.

Pinion gear 14 is secured to the lower end of output shaft 34 so as to position the pinion gear in underlying relation to base plate 10 for rotation on the central axis 36 of the stepper motor 12.

Lead screw gear 16 is mounted for rotation beneath plate 10 about an axis 38, parallel to but laterally spaced from axis 36, and drivingly meshingly engages pinion gear 14 at its outer periphery so that rotation of the pinion gear 14 about axis 36 rotates lead screw gear 16 about axis 38. Gears 14 and 16 are preferably formed of an acetal plastic material and may provide, for example, a five to one reduction ratio so that lead screw gear 16 rotates one-fifth of a revolution for each complete revolution of pinion gear 14.

Carriage 18 may be formed, for example, from a polycarbonate material which is teflon impregnated and glass fiber filled so as to combine the strength of the glass fibers, the rigidity of the polycarbonate, and the lubricating properties of the teflon. Carriage 18 includes a main body portion 18a, an upper arm portion 18b, a pair of lugs 18c and 18d, a yoke portion 18e, and a partial nut 18f. Lugs 18c and 18d are vertically aligned and vertically spaced and partial nut 18f defines an arcuate threaded surface 18g and a pair of rectangular lugs or embossments 18h formed on the respective side faces 18i and 18j of 18f. Arcuate threaded surface 18g preferably has an arcuate extent of approximately 120°. Each lug 18h displays a triangular configuration in plan view so as to provide a ramp configuration.

Head 20 is of known form and it is nestingly received in yoke portion 18e of carriage 18. Head 20 is preferably potted into yoke portion 18e utilizing a suitable epoxy. Head 20 coacts in known manner with a magnetic tape 40 driven past the head by the tape drive so that the head may record or read information embodied in the several parallel tracks 40a of the tape.

Guide shaft 24 is cylindrical and is received at its lower end in a socket 10j provided in base plate platform portion 10f and passes slidably successively through lugs 18d and 18c of the carriage. Shaft 24 is preferably formed of a stainless steel material.

Lead screw 26 includes a lower smooth shank portion 26a, an upper threaded portion 26b, and a collar 26c interposed between the lower end of upper threaded portion 26a and the upper end of lower shank portion 26a. Shank portion 26a is received in the central bore 10k of pedestal 10g of the base member and is attached at its lower end 26d to the center of lead screw gear 16 so that lead screw gear 16 and lead screw 26 rotate about axis 38 in response to energization of motor 12. A wave washer 42 compressedly interposed between the upper face of lead screw gear 16 and the lower face of the base plate acts to urge lead screw collar 26c downwardly against the upper face of pedestal 10g and thereby preclude vertical movement of the lead screw relative to the carriage. It will be seen that the upper threaded end portion 26b of lead screw 26 threadably engages the threads 18g of the half nut 18f of carriage 18 so that energization of motor 12 results in rotation of lead screw 26 which in turn results in upward or downward movement of carriage 18 on guide shaft 24 in response to the camming threaded engagement of lead screw threaded portion 26b with the threads 18g of half nut 18f.

Clip or band 28 is formed of a suitable steel material and has a U-shaped configuration including parallel leg portions 28a and a bight portion 28b interconnecting the leg portions. A rectangular mounting opening 28c is provided proximate the free end of each leg portion 28a sized to snappingly and snugly receive a respective rectangular lug 18h on half nut 18f so that spring clip 28 may be readily and fixedly secured to half nut 18f by pushing the legs 28a over the lugs 18h. As the leg portions are pushed onto the lugs they ride up the ramp surface defined by the lugs until the apertures 28c clear the distal end edges 18i of the lugs whereupon the clip openings 28c snap into place over the lugs 18h to firmly and positively lock the clip on the carriage.

The spring clip is dimensioned such that, when thus mounted on the half nut 18f, the bight portion 28b biasingly engages the threads of the thread portion 26b of lead screw 26 at an outboard location on the threads generally diametrically opposed to the location of the threaded engagement of the portion 26b with the threads 18g of the half nut so that the bight portion 28b constantly acts to exert a radially inwardly extending force against the lead screw thread portion 26b so as to press the threads of the thread portion into firm camming coaction with the threads 18g of the half nut. As a result, there is no lost motion between the lead screw and the carriage when rotation of the lead screw is initiated to move the tape head from one track 40a to an adjacent track 40a; there is no lost motion when the rotation of the lead screw is terminated upon arrival of the head at the adjacent track 40a; and the carriage and thereby the head cannot move relative to the lead screw following arrival of the head at the adjacent track 40a unless and until the lead screw is again rotated by energization of the motor 12.

It will be understood that the force exerted on the lead screw by the spring clip is reacted against the force exerted by the clip against the distal end edges 18i of the lugs 18h so that the clip provides a positive frictional driving engagement as between the lead screw and the half nut and so that the clip is positively locked in place on the half nut.

Figure 8:
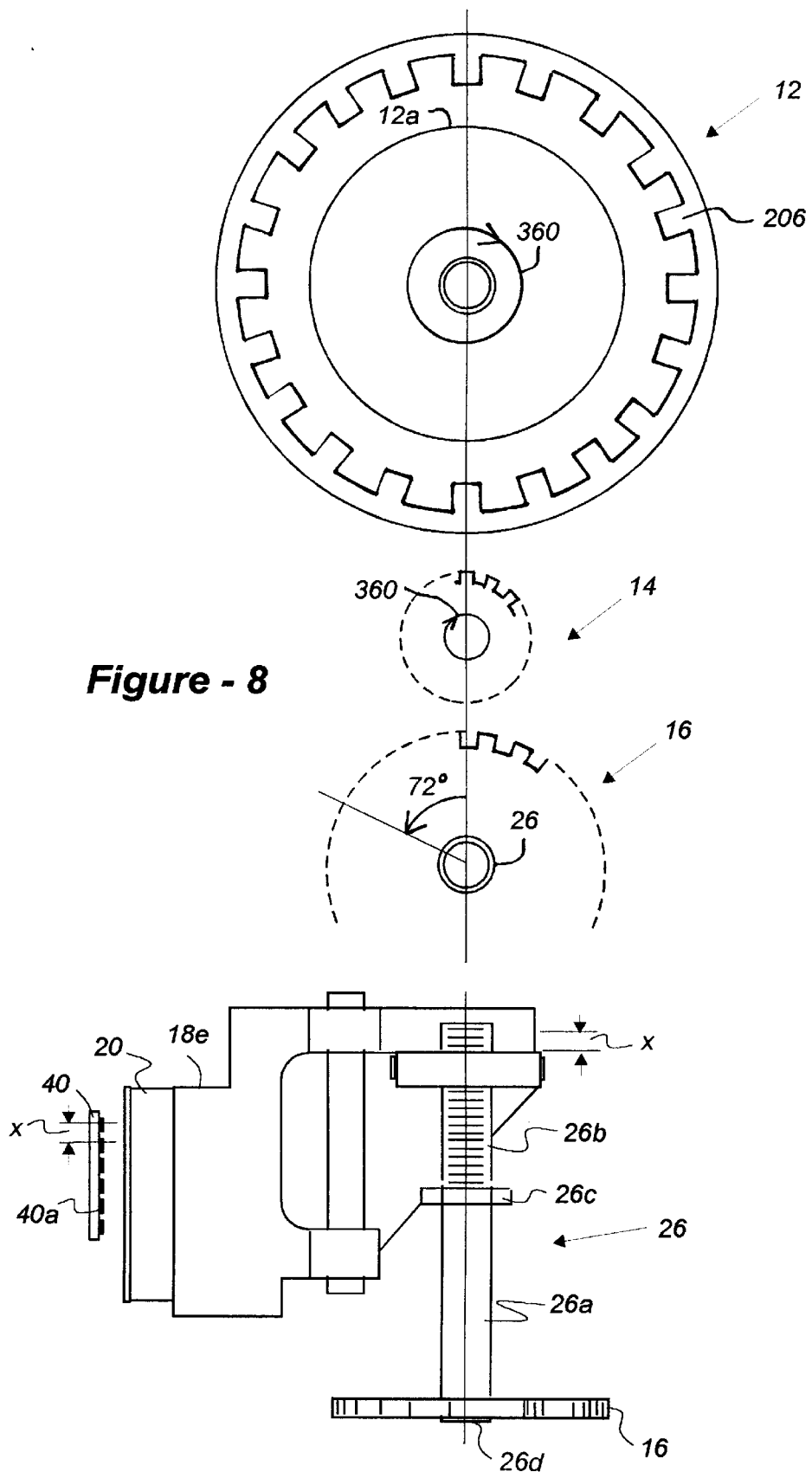
FIG. 8 is a diagrammatic view illustrating a methodology employed in the invention head positioning apparatus.

According to a further feature of the invention apparatus and methodology, the drive means between stepper motor 12 and carriage 18 is arranged such that one complete revolution of the stepper motor is equated precisely to the movement of head 20 between adjacent tracks 40a of magnetic tape 40. This methodology is best seen in FIG. 8.

Specifically, rather than have the armature 12a of the stepper motor step through a fraction of the poles 12b of the stepper motor to move the head 20 between adjacent tracks, or rather than have the armature 12a step through more than a complete revolution to move the head 20 between adjacent tracks, the drive means between the stepper motor and the head is arranged such that the armature steps through one complete revolution, returning to the same point from which it began its movement, to accomplish movement of the head between adjacent tracks. This ensures accuracy of the movement and positioning of the head relative to each track by eliminating step to step angular errors that might occur if the stepper motor were to begin its inter-track movement at one pole and end its inter-track movement at another pole.

For example, pinion gear 14 and lead screw gear 16 may have a 5:1 ratio so that one complete revolution of the stepper motor results in one complete revolution of the pinion gear 14 and 72 degrees of rotation of lead screw gear 16 and thereby lead screw 26. The threads of coacting threaded lead screw portion 26b and half nut 18c are chosen such that a 72 degree rotation of the lead screw results in an upward or downward movement X of the carriage and the magnitude of X is calculated to precisely match the distance Y between adjacent tracks 40a on the tape 40. Thus, one complete revolution of the stepper motor, beginning and ending at the same pole for purposes of precise control, results in movement of the carriage and thereby the head through a linear distance precisely matching the distance between adjacent tracks 40a whereby to ensure precise positioning of the head relative to each track.

This precise positioning of the head relative to each track as the head is moved between adjacent tracks, in combination with the precise starting and stopping of the head relative to the lead screw as achieved by the constant biasing action of the spring clip, and in further combination with the positive holding of the head at each track as also achieved by the constant biasing action of the spring clip, provides a head positioning apparatus that is precise, positive and accurate in all aspects of its operation. Further, the invention head, positioning apparatus achieves its precision operation with an extremely simple mechanism which utilizes a minimum number of parts, and minimizes mechanism complexity, as compared to prior art head positioning apparatus.

Whereas a preferred embodiment of the invention has been illustrated and described in detail it will be apparent that various changes may be made in the disclosed embodiment without departing from the scope or spirit of the invention. For example, although the invention has been described in association with magnetic tapes, it will be apparent that the invention is equally applicable to other types of tape such as optical tapes.

I claim:

1. A head positioning apparatus for a tape drive for positioning the head of the tape drive relative to the tape and including a carriage carrying the head and drive means, including a lead screw, operative in response to rotation of the lead screw to move the carriage and thereby position the head, characterized in that the drive means includes thread means fixedly defined on the carriage and spring means acting on the lead screw and urging the lead screw laterally relative to the rotational axis of the lead screw into firm camming frictional driving engagement with the carriage thread means.

2. An apparatus according to claim 1 wherein the thread means includes arcuate partial threads defined on the carriage.

3. An apparatus according to claim 2 wherein the partial threads have an arcuate extent of less than 180°.

4. An apparatus according to claim 1 wherein the spring means comprises a band of steel secured at its opposite ends to the carriage and embracing the lead screw.

5. An apparatus according to claim 1 wherein the carriage includes a first end proximate the tape and a second end remote from the tape, the carriage is mounted intermediate its ends on a guide shaft, the head is mounted on the first carriage end, and the partial threads are defined on the carriage proximate the second carriage end.

6. An apparatus according to claim 1 wherein the drive means further includes a stepper motor, and a gear train including a pinion gear driven by the stepper motor and a lead screw gear driving the lead screw and driven peripherally by the pinion gear.

7. An apparatus according to claim 1 wherein the tape is a magnetic tape.

8. An apparatus for positioning the head of a tape drive relative to the tape and including a lead screw, a carriage carrying the head, and thread means on the carriage threadingly coacting with the lead screw to selectively move the carriage and thereby the head relative to the tape in response to rotation of the lead screw, characterized in that the lead screw is held against the carriage thread means by a spring clip secured to the carriages, embracing the lead screw, and urging the lead screw into firm camming frictional engagement with the carriage thread means.

9. An apparatus according to claim 8 wherein the clip has a U-configuration including spaced leg portions and a central bight portion, the leg portions are secured to the carriage, and the bight portion engages the lead screw at a location generally diametrically opposed to the location of the threaded engagement of the lead screw with the carriage thread means.

10. An apparatus according to claim 8 wherein the tape is a magnetic tape.

* * * * *